US012560144B2

(12) United States Patent
Von Grozny

(10) Patent No.: US 12,560,144 B2
(45) Date of Patent: Feb. 24, 2026

(54) HERMETIC CAP TIDAL PULSE RESPONDER

(71) Applicant: James Frederick Gorin Von Grozny, Great Torrington Devon (GB)

(72) Inventor: James Frederick Gorin Von Grozny, Great Torrington Devon (GB)

( * ) Notice: Subject to any disclaimer, the term of this patent is extended or adjusted under 35 U.S.C. 154(b) by 0 days.

(21) Appl. No.: 18/563,402

(22) PCT Filed: May 23, 2022

(86) PCT No.: PCT/EP2022/063930

§ 371 (c)(1),
(2) Date: Nov. 22, 2023

(87) PCT Pub. No.: WO2022/248417

PCT Pub. Date: Dec. 1, 2022

(65) Prior Publication Data

US 2024/0271592 A1 Aug. 15, 2024

(51) Int. Cl.
*F03B 13/00* (2006.01)
*F03B 13/26* (2006.01)

(52) U.S. Cl.
CPC ........ *F03B 13/266* (2013.01); *F05B 2210/18* (2013.01)

(58) Field of Classification Search
CPC ................ F03B 13/266; F05B 2210/18; F05B 2210/404; F05B 2240/9151
See application file for complete search history.

(56) References Cited

U.S. PATENT DOCUMENTS

| | | | | |
|---|---|---|---|---|
| 2,484,183 | A | 10/1949 | Paulson | |
| 3,925,986 | A | 12/1975 | Barwick | |
| 4,103,490 | A | 8/1978 | Gorlov | |
| 7,795,748 | B2 * | 9/2010 | DeAngeles | F03B 17/04 290/43 |
| 7,830,032 | B1 * | 11/2010 | Breen | F03B 13/142 290/55 |

(Continued)

FOREIGN PATENT DOCUMENTS

KR 20090096586 9/2009

OTHER PUBLICATIONS

European Patent Office; International Search Report and Written Opinion for PCT/EP2022/063930; Sep. 21, 2022; entire document.

*Primary Examiner* — Julio C. Gonzalez
(74) *Attorney, Agent, or Firm* — ALLEN, DYER, DOPPELT & GILCHRIST, P.A.

(57) ABSTRACT

A concave hermetic air/brine encapsulating vessel, or cap 10, positioned in the sea at a chosen area according to tidal range. Wherein the open underside of the vessel allows brine/sea water to freely enter or exit the vessel and the tide rises and falls respectively. This rise and fall of the brine within the vessel will result in changes to the air pressure within the vessel, as the air because pressurised as the brine rises, and forms a vacuum with the vessel as the brine falls. These changes in pressure are used to operate a pneumatic actuator 60, via a suitable system of valves 50,52 coupled to the inlets and/or outlets of a pipe couple to a vent 30 on the upper portion of the vessel, or within a plurality of pipes couple to a manifold 40 coupled to the vent 30. Wherein the operation of the pneumatic actuator 60 powers a generator 62 for producing and storing power.

11 Claims, 3 Drawing Sheets

(56) References Cited

U.S. PATENT DOCUMENTS

Figure 1:
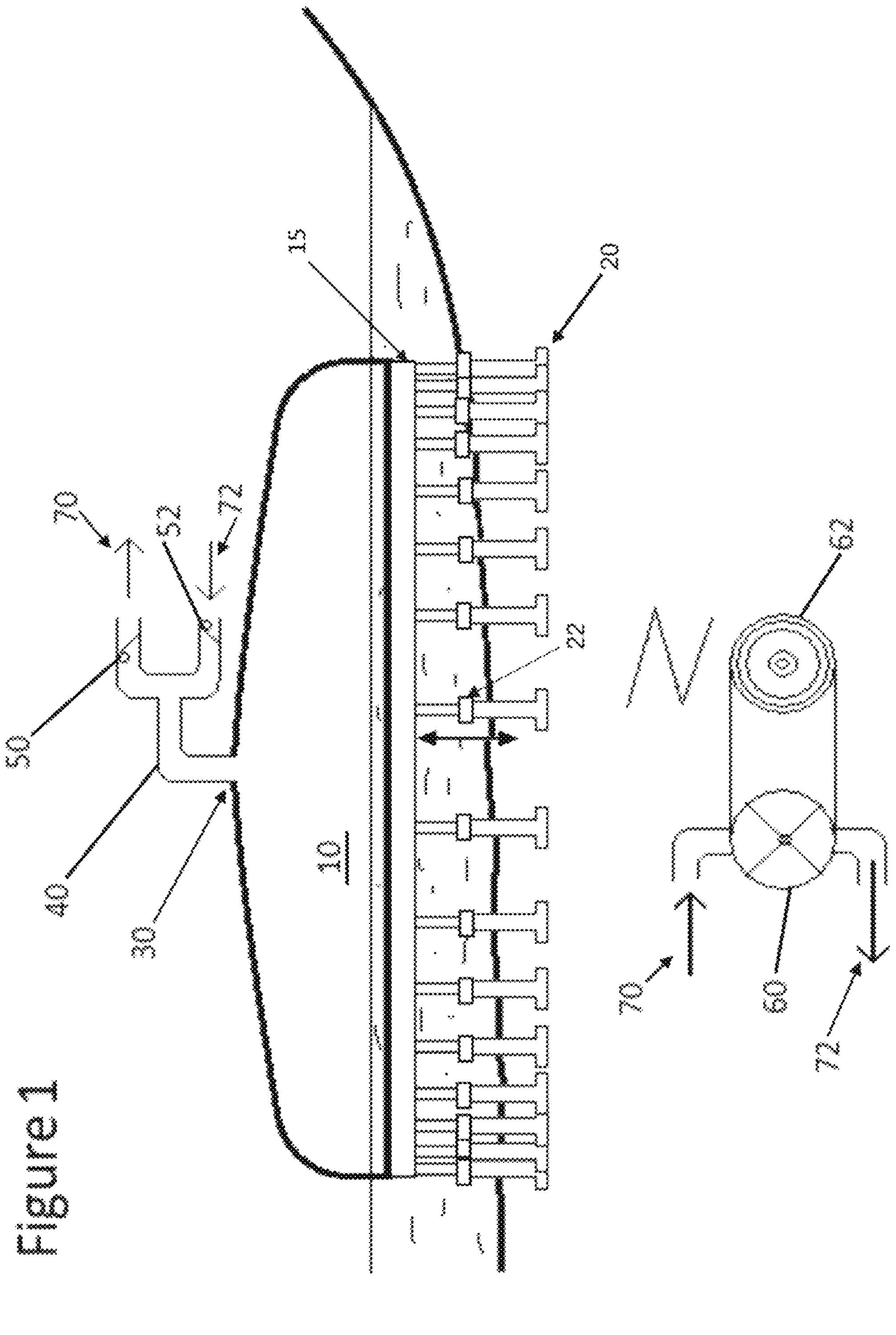

| | | | | |
|---|---|---|---|---|
| 2007/0018461 | A1 * | 1/2007 | Hardy | F03B 17/005<br>290/54 |
| 2007/0228736 | A1 * | 10/2007 | Smushkovich | F03B 15/00<br>290/42 |

* cited by examiner

HERMETIC CAP TIDAL PULSE RESPONDER

BACKGROUND

Sustainable sources of clean electrical power are an increasing global priority. While accelerating consumption in transport, temperature control, automation and IT has expanded the demand and need for a viable, dependable solution.

Currently conversion of wind and sunlight into electrical power are widely adopted alternatives to carbon and nuclear, although both technologies create environmental problems and depend on weather. More specifically, the power produced by these methods are inconsistent due to their dependencies on the weather, meaning they may produce insufficient power when there is a high demand, and methods of storing the generated power are limited.

Similarly wave technology depends on the weather, while individual responders are limited in proportion of capture size, because of the limited duration of wave-pulse undulation, An alternative source of clean power is tidal and wave capturing technologies. Technologies to capture the power of waves are under development, but similarly to wind turbines and solar panels, rely on weather conditions. Though the presence of waves is more consistent than sunlight and wind, there is still a problem with consistency as some days there will be fewer, smaller waves compared to other. Additionally in adverse weather, such as a storm, the waves can become too powerful and may actually damage the capturing technology, so during such weather no power can be generated. Furthermore, the field output depends on the practical size, performance and plurality of individual units. The kinetic impulse of transient waves is limited in both scale and duration, determining the maximum effective dimension and so not scalable. Similarly, tidal stream technology relies on a limited field, or depth of force on the ocean floor and not scalable. Furthermore, tidal stream actuation only occurs during low tide.

Tidal Lagoons or Barriers incorporating bi-directional turbines have been proposed, but none yet built or implemented in UK.

Another disadvantage common of contemporary generation, including wave, solar and wind, is that the generated product/power is not economically stored, due to the cost of producing the necessary batteries, or other storage medium. Additionally, some storage method decay, losing power, or losing storage capacity, over time, resulting in the need for more batteries to be produced. Therefore, there is a need for a clean power source which can produce a consistent output, and is not dependent on storing the power for later use.

The perpetual and continuous rise and fall of earth's oceans is the planet's most powerful, dependable phenomenon, and the most abundant source of useful kinetic energy. However, the slow, near imperceptible motion of tidal surface has eluded economical capture and escaped attention.

However, the claim invention seeks to provide a means of harnessing, this kinetic energy, as the tides rise and fall. Additionally, the method will preferably provide a means of storing said energy so that it can be harnessed when there are additional energy demands.

SUMMARY

The present invention provides a tidal power generator system for generating clean energy, that is suitable for generating power in the sea, or other body of liquid, by harnessing power from tidal changes. Wherein the tidal power generator system comprises a body positioned on the water, comprising a hermetic cap, which is positioned with the open portion of the hermetic cap in the sea, or other body of liquid. This cap would be positioned at a suitable height within the body of liquid, so that even at a low tide there would some liquid in the open portion of the cap, so as to form a trapped pocket of air within the hermetic cap. So that as the tide rises and falls, the pressure of the trapped air within the cap increases and decreases respectively, as the level of water within the hermetic cap rises and falls with the tide. Wherein the pressurised air within the cap can be used to create an airflow that may be used to activate a generator, as described in detail below.

It is noted that, once positioned, the hermetic cap may be secured to a suitable foundation, such as the sea bed, it should be noted that in this case the term 'sea bed' may refer to an actual sea bed, an estuary floor, or the ground at the bottom of the body of liquid used to generate power, via a support structure, such as a plurality of pillar, which can support the cap while still allowing water to enter/exit the cap. By securing the hermetic cap in such a manner the user prevents the cap from moving when in use. More specifically, the secured cap is prevented from rising and lowering with the tide, instead the cap may remain at a constant height to maximise the pressure changes within the cap, thereby producing more power as there should be a larger pressure differential with the cap. Additionally, the securing of the cap to the sea bed, also prevents the cap from drifting away from its respective generator, as such movements may damage the pipes, and other equipment, coupled to the hermetic cap. however it is noted that the cap may be able to move slightly, by being secured to the support structure by a flexible member, or other suitable means that would allow the cap limited movement relative to the support structure. This is so the cap may raise, or lower relative to changes in the tidal range. These changes may include seasonal changes to the maximum and minimum tidal height, or changes in the average height of the body of liquid.

The hermetic cap also comprises one or more vents in an upper part of the hermetic cap, the upper portion in this case referring to any portion of the hermetic lid that is not submerged in the body of liquid. Said vent, or vents, are coupled to a pipe so that the air in the hermetic cap may travel through the pipes, as the air pressure within the cap changes. These pipes may further comprise a respective valve, which is used to control the size and/or direction of the air flow within the pipe. There are many different configurations of vent, pipes and valves that may be used. For example, the simplest configuration would comprise a single vent, couple to a single pipe, with a valve within the pipe to control the flow rate of air through said pipe. However, such a configuration may not be the most efficient, for it is noted that in the direction of the air flow within the system will change over time, with the changes in the tide, meaning the generator may only be active half of the time. For example, when the tide is rising, the water level rises within the hermetic cap, this in turn will increase the pressure of the air trapped within the cap, forcing the air out of the vent(s) in the upper portion. However, as the tide fall, water escapes the hermetic cap which forms a vacuum in the upper portion, this vacuum would cause a suction of air into the hermetic cap. and it is noted that the suction caused by the vacuum would force the air in the system to flow in the opposite direction, to that of the air flow of pressurised air when the tide was rising. This is why in the preferred embodiment there would be at least two pipe that couple to the vent, via a manifold or other suitable converger, wherein each pipe would contain a valve, preferably a unidirectional valve, so that only one pipe would carry the pressurized air away from the hermetic cap, while the other pipe would return the same air when the vacuum forms, this way the user can ensure that the air travels in a fixed direction around the system. More specifically, the pipes user to direct the pressurised air would be positioned upstream from a pneumatic actuator, while the pipes that provide the suction would be downstream from said actuator, so even as the direction of the tide changes, the force exerted by the air flow upon said actuator would remain in the same direction, allowing the generator to be active regardless of the direction of the tide.

However, regardless of the arrangement of pipes at the vent of the cap, the system will aways connect to a pneumatic actuator that is configured to be actuated by air flow caused by the pressure changes within the hermetic cap. More specifically, the actuator would rotate as the pressure causes air to flow through the pipe, either by pressurised air being forced through the pipes, or by the suction generated by a vacuum formed in the hermetic cap. Wherein said actuator is coupled to a generator, so that the generator is powered by the motion of the pneumatic actuator. It is noted that in the example with only one pipe between the cap and the actuator, the generator may only be powered half of the time, as the actuator would only power the generator when moving in a specific direction. As the tide rises and falls, the pressure changes would cause the air in the pipe to flow in opposite directions dependent on the direction of the tide. This is why the two-pipe system, or a system with multiple pipes is preferable, as by using valves coupled to the various pipes the system can ensure the direction of the air flow through the system may remain constant regardless of the direction of the tide. For when the tide rises the pressurised air traveling through a first pipe provides the driving force to the actuator, but as the tide falls, the suction of the vacuum within the cap is directed through a second pipe to drives the actuator, thereby ensuring that the actuator is constantly driven in the same direction thereby powering the generator at all times. It is also note that for safety, even in a system with only one pipe, the user may still want a valve so that they can at least control the flow rate of the air within the pipe to help prevent damage to the actuator and/or generator. And may also use the valves to seal the pipes so that the pressure, or vacuum within the cap can build first to ensure that a sufficient amount of force is delivered to the actuator.

The hermetic cap may further comprise a skirt along the edge of the open portion of the cap. Wherein said skirt is configured to prevent the air trapped within the cap from escaping. More specifically, during low-tide, after the tide has fallen, there may be only a small amount of water within the hermetic cap, as a result the changes within the surface of the water caused by waves, or other fluctuations, may cause the water level to fall below the sides of the cap, thereby allow the air to flow into the cap due to the vacuums suction. in either case there would be a loss, or decrease in the pressure differential within the cap. Which could decrease the driving force within the pneumatic actuator, resulting in a loss of power in the generator. Therefore, the skirt helps to extend the walls of the cap to prevent this effect occurring. Additionally, the skirt may be made of a flexible material to help to deflect wave that approach the cap, or at least reduce the size of such waves, by absorbing their kinetic energy as they impact the skirt, to reduce the effects such waves have on the water level.

As mentioned, it is preferable for the body of the hermetic cap of the system to be secured to a suitable foundation, such as a sea bed. In the preferable embodiment the body of the cap would be secured using a plurality of pillars, or columns, which are embedded into the foundation so as to secure the cap in place. Additionally, by using columns instead of a solid wall, the columns may still allow water to flow into, and out of, the cap from all directions, thereby ensuring the maximum amount of water enters/leaves the cap to form the largest possible pressure change to the air within the cap. As the use of a solid wall may prevent the flow of water in certain directions. Additionally, the plurality of column may better withstand the potential constant forces caused by waves, and currents, within the body of liquid, due to the limited surface area exposed to the moving waves, thereby limiting the amount of force exerted on the columns.

Further the aforementioned vertical columns may be configured to telescopically expand, allowing the height of the columns to be adjusted. The reason for such height adjustments, is that it may allow the height of the hermetic cap to change in response to changes in tidal levels. Especially as throughout the year there is a slight shift in tidal hights meaning the height of the low-tide, and high-tide, is not consistent over the year. Therefore, the cap may need to be raised by expanding the telescopically expanding vertical columns, or lowered by contracting the telescopically expanding vertical columns, to ensure the water level within the cap at low tide remains at a desired level, so that the vacuum does not pull air into the cap from the surrounding air. Additionally, the cap may need to be raised by expanding the telescopically expanding vertical columns, when the high tide water level rises, to try and ensure the cap, or more importantly the cap's vent stays above the water level within the cap, so that water does not enter the pipes, as this may affect the air flow in the pipe, obstructing the air, which may reduce the force exerted onto the pneumatic actuator. Additionally, there are also the possibility of changes to the global sea levels, due to melting of the polar ice caps, therefore the hight of the cap may need to be further adjusted by expanding the telescopically expanding vertical columns, to correct for changes in sea-level. The expanding and contracting will be carried out my means known in the art in response to the aforementioned tidal conditions.

It is also noted that with the changes in the water level it may also be preferable to ensure that the vent that is coupled to the body of the cap, is coupled to the upper most part of the cap. This way the design reduces the risk of water reaching the vent, as the height of the water increases, whether due to tidal changes or waves within the body of water. This may be necessary as water entering the pipe, or the pneumatic actuator, may obstruct the air flow through the system. This may cause a loss in the force exerted onto the actuator, thereby reducing the amount of power generated. Additionally, having the vent at the uppermost part of the body may also help ensure that the vent does not become submerged. Though the vent becoming submerged should not be a problem to normal operations, it may increase the risk of water entering the systems pipes, therefore it may be preferable to try to prevent the vent being submerge just to reduce the risk water entering the vent.

Another feature that would be preferable for the present invention is for the previously mentioned pneumatic actuator to comprises a turbine. Wherein the pressurised air flow, or vacuum suction, from the cap will exert force on the turbine, causing it turbine to turn the generator to produce power. As the use of a turbine as the actuator may help maximise the amount of power generated by a given air flow, when compared to other forms of actuator. It is noted that in a system with a single pipe coupled to the cap, such a turbine may only be 50% effective, as the direction of the force, and therefore the direction the turbine rotates, may change with the direction of the tide, as such a turbine may only generate power when turning in a specific direction.

One way to overcome this issue may be to use turbines with rotatable blades. Where the blades of the turbine are configured to pivot about the blade's longitudinal axis. wherein in response to changes in the direction of the air flow, the blades of the turbine unlock allowing the blades to pivot. After unlocking the blades could be turned manually by a suitable mechanism within the turbine, or automatically by the force exerted on the blades by the air flow. After which the blades of the turbine will again lock into place. Once the blades are locked in place the force of the air flow will begin turning the turbine once more. By doing so the system ensures that the turbine rotates in the same direction, after the direction of the air flow changes due to the changing tide.

Alternatively, the pneumatic generator may comprise two or more turbines, wherein at least one of the turbines is configured to rotate the generator, in the direction to generate power, when pressurised air flow from the cap into the actuator. And, at least one of the other turbines may have blades in the opposite direction, so that this second turbine rotates the generator when the air flow out of, or away from, the actuator. This way the system ensures that at least one of the turbines are consistently turning in the direction needed to generate power regardless of the direction of the air flow. It is noted that the above-mentioned turbines may be used in a system comprising only one pipe between the vent and the actuator/turbine.

Another option to ensure the turbine rotates in a constant direction, even when the tide change, is to have a system with at least two pipes, that are coupled to the vent of the cap. Wherein one pipe is configured to be upstream from the turbine and the other pipe is configured to be downstream from the turbine, both pipes may also comprise a respective valve. This way when the tide rises and the air pressure inside the cap increases, the valve in one pipe can be opened forcing the pressurised air down a specific pipe to turn the turbine in the desired direction. Then as the tide falls, forming a vacuum within the cap, the valve to the first pipe closes, and the valve of the other pipe opens, so that the suction created by the vacuum continues to turn the turbine in the same direction. Thereby ensuring the turbine turns in the same direction regardless of the direction of the tide. To help remove the need to continuously monitor the valves within the system, the valves may be unidirectional, with the valves in the upstream pipes blocking the flow in one direction, and the valves in the downstream pipes blocking the flow in the opposite direction, wherein said valves are open by the air flow itself. This may help remove the need for monitoring systems that would need to detect the change in the direction of the air flow, to trigger the systems valves opening to closing. It is also noted that in these systems the valves may also be used to restrict the airflow until a certain driving force is reached, for example when the tide is rising the valves may close until a predetermined pressure is reached within the cap. This way the system can allow the driving force to build before the airflow is opened to ensure that there is sufficient force to operate the actuator, and to try and produce more power when the tide changes.

In another design for the present invention, the sides of the body of the cap may extend towards the foundation, so as to form a sealed cylinder between the cap and the foundation. This cylinder will then comprise one or more vents on the side of the cylinder, which allows water to freely flow into and out of the cylinder, so that the water level within the cylinder can rise and fall with the changes in the tide. The walls of the cylinder may help to ensure that the air within the cap does not escape from the cap, by positioning the cylinders vents below the waterline of the body of liquid, so that the waves on the surface do not affect the water in the cap. Additionally, there may be a generator coupled to at least one of the vents within the cylinder, configured so that the force of the water flowing through the vents turn the generator, via a turbine positioned within the vent, thereby providing additional power production to the system. For in this system, both the force of the water flowing in/out of the cylinder of the cap, and the flow of the air flowing through the pipes coupled to the cap, are generating power via respective generators. Thereby generating more power from the same tidal changes.

It is noted that the sides of the cylinder may further comprise one or more pumps. Wherein said pumps can be used to control the water level inside the hermetic cap. In particular, in cases wherein the water level within the cylinder is rising too high, to a point where there is a risk of the water entering the airflow pipes, such pumps can be used to reduce the water level within the cap. Alternatively, the pumps may change the water level to simulate the conditions of either a raising or lowering tide to help generate additional power during periods of high demand. For example, during a high tide additional water may be pumped into the cylinder to further increase the pressure of the pressurised air within the cap. Or during a low tide the pumps may pump out additional water to increase the size of the vacuum, to try and increase the suction produced. Such pumps may also be coupled to the cap itself in order to pump water (or air) into, or out of, the hermetic cap, in systems without such cylinders.

It is also noted that the disclosed tidal power generator of may also comprise a means of storing a portion of the power the system generated, such as a plurality of batteries, wherein at least a portion of the power from the generators of the system is stored for later use. this system may be used in times of low demand to store the excess power generated. This stored energy may be used to supply additional power during times of high demand wherein the power from the air flow alone may not be sufficient. In some systems, this stored power may be used to activate pumps within the hermetic cap, or within the cylinder walls extending from the cap, to change the water level within the hermetic cap to help produce more power during periods of high demand. For example, when the tide is rising the pumps may be used to increase the amount of water in the cylinder, thereby increasing the air pressure within the hermetic cap to increase the amount of power being produced due to the increased air flow, caused by the increased air pressure. Alternatively, when the tide is falling these same pumps may reduce the amount of water in the cylinder to try an increase the volume of the vacuum within the hermetic cap to try and increase the amount of suction being produced.

It is noted that in the present invention the size of the vent and pipes used to direct the airflow to the actuator, relative to the size of the hermetic cap, may affect the amount of force produced. More specifically, it is noted that the ratio between the surface area of the opening of the hermetic cap and the vent coupled to the cap can increase the velocity of the airflow to increase the amount of force produce, in the form of work done by the airflow, in the preferred embodiment this ratio would be 10000:1 or more. It is also noted that the ratio between the inlet and the outlet of the pipes between the vent and the pneumatic actuator can similarly increase the force generated by the airflow, therefore it may be preferable in come embodiments to have multiple smaller pipes attached to the vent, rather than just one. It is noted that in such an arrangement, each pipe of the plurality of pipes may be directed to a respective actuator, so that the increased force does not dissipate when exiting the outlet of the pipe, which may happen due to an increase in surface area, if all of the system's pipes feed into a common chamber or manifold. Additionally, the plurality of smaller pipes may be arranged in pairs, with the airflow being directed towards the respective actuator within one pipe of each pair, and away from the actuator in the outer pipe of each pair. Thereby creating a directional path for the airflow that ensures the actuator is push in a constant direction, regardless of the direction of the tide as described above. It is also noted that the hermetic cap may include a plurality of vents each coupled to a respective pipe of the plurality of pipes to help reduce the size of the vent, to increase the above-mentioned ratio between the size of the vent and the surface area of the hermetic cap opening. By using these smaller dimensions for the vent and pipes, the work down by the airflow may be increased for a given change in the tidal height, thereby increasing the amount of power produced.

It is further noted that to increase this ratio, and to increase the amount of power generated, it is preferable for the hermetic cap to cover a large area. Therefore, the hermetic cap needs to be made of material that is easy to produce on a large scale, and can withstand a lot of force over a large area, as the material will need to withstand its own weight, give the large surface area of the hermetic cap, while also withstanding the force produce by the pressurised air/vacuum within the cap, and the force of any waves that impact the side of the hermetic cap. Therefore, it is preferable that the present invention be made of a reinforced material that can withstand the various forces exerted onto the hermetic cap, such as reinforced concrete. Such reinforced materials may also be used for the columns or walls used to support the hermetic cap. Further, it may be preferable to use a material that can be easily shaped to the desired dimension, while still providing sufficient strength, because of the large dimensions required for the hermetic cap, it may also be preferable to have the cap be made of a sufficiently strong sheet material, such as re-formed mixed plastics.

In summary the mechanism of the claimed tidal wave generator comprises; having a body comprising a hermetic cap, positioned over a body of liquid, typically water, that undergoes tidal changes, or regular changes in the height of the liquid. This way as the liquid rises the air trapped within the hermetic cap will become pressurised, as the air pressure inside the cap increases. This high-pressure air can then flow out of the cap, via a vent within the surface of the cap, into a pipe. The pipe directs the flow of high-pressure air towards a pneumatic actuator. Wherein the force exerted by the air flow will actuate said actuator, this in turn will operate a generator thereby producing power. The pipe directing the air may also include a valve, which can be used to limit the air flow in the pipe, or to seal the vent until a desired air pressure has been reached, the desired pressure being based on the force necessary to actuate the pneumatic actuator.

However, when the tide falls the air pressure within the cap decreases, and may form a vacuum within the cap. This vacuum produces suction that may pull the air back through the pipe, thereby reversing the direction of the airflow, forcing the actuator in the opposite direction, which may not power the generator. As a result, this system may only be 50% effective, if there is only one pipe, or no means to control the direction of the airflow.

Therefore, in the preferred the vent would be coupled to two or more pipes, wherein at least one of the pipes is upstream from the actuator, and at least one pipe is downstream of the actuator, with each pipe having a respective valve. Wherein when the tide rises the pressurised air can be directed through a first pipe, for example the upstream pipe, to push the actuator in the necessary direction to generate power. Then when the tide falls the valve to the upstream pipes can be closed and the valves to the downstream pipes opened so that the suction of the generated vacuum pulls air through the downstream pipes towards the cap. This way the suction of the vacuum may force the actuator in the same direction as the pressurised air, allowing the generator to constantly generate power.

Additionally, as the tide changes the system may close all of the valves to allow the pressure/vacuum within the cap to build before opening the valve of the necessary pipe, to ensure that sufficient force will be created at the actuator. In some cases, the cap may include one or more pumps within the cap, or a cylinder connected to the cap, wherein these pumps can be used to change the water level within the cap, thereby allow the system to increase the amount of force being exerted onto the actuator, by pumping water into or out of the cap depending on the direction of the tide. This may allow the system to increase the amount of power being generated during periods of high demand. It is also note that a portion of the power generated may be stored to power the aforementioned pumps, and to also provide additional power during times of high demand.

By using the above mention system, the present invention aims to provide an eco-friendly power alternative, by having a system that uses tidal changes to generate power.

DETAILED DESCRIPTION

The present invention is depicted in the following drawings:

FIG. 1: depicts the present invention during low-tide

Figure 2:
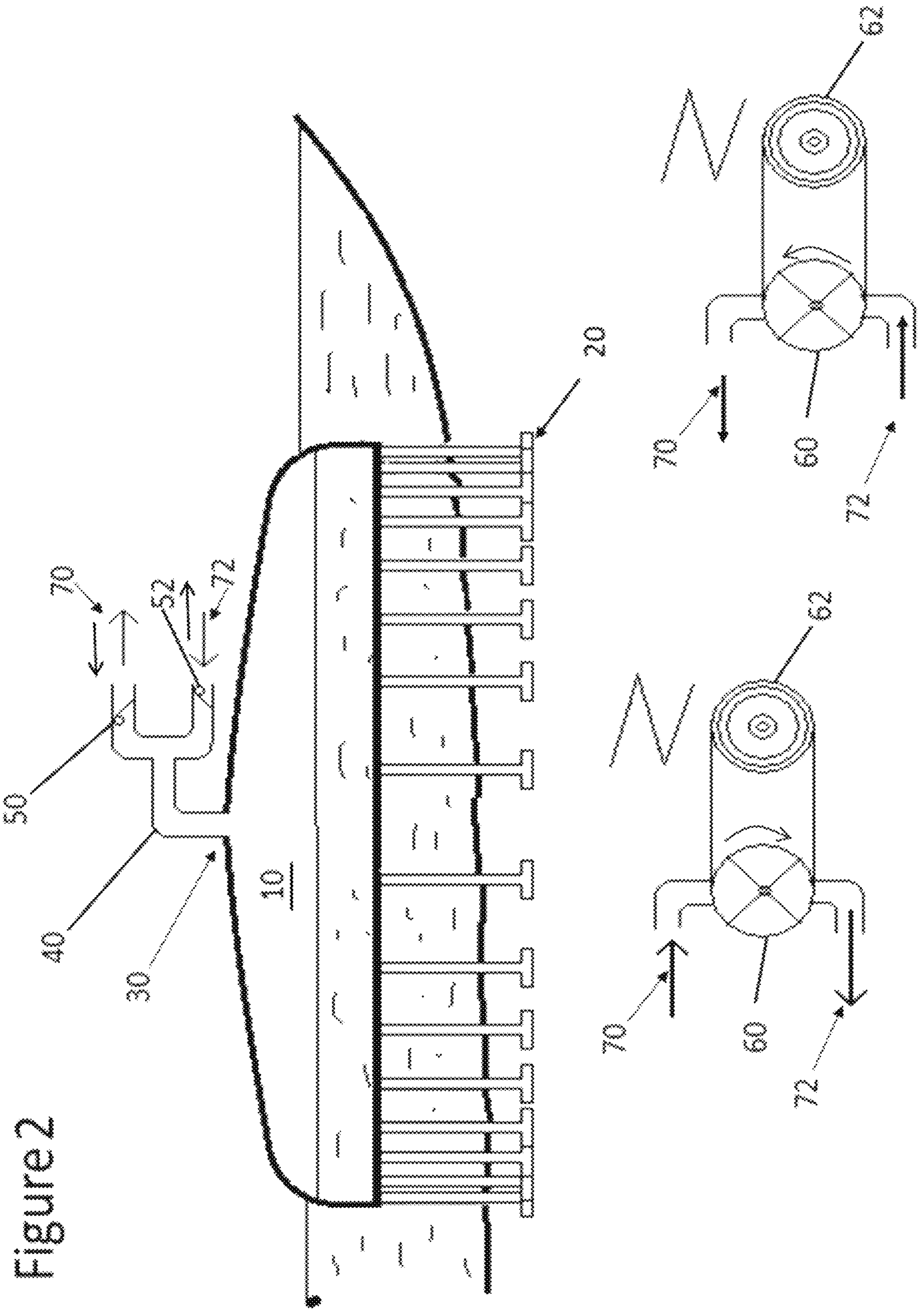

FIG. 2: depicts the present invention during high-tide/when the tide rises.

Figure 3:
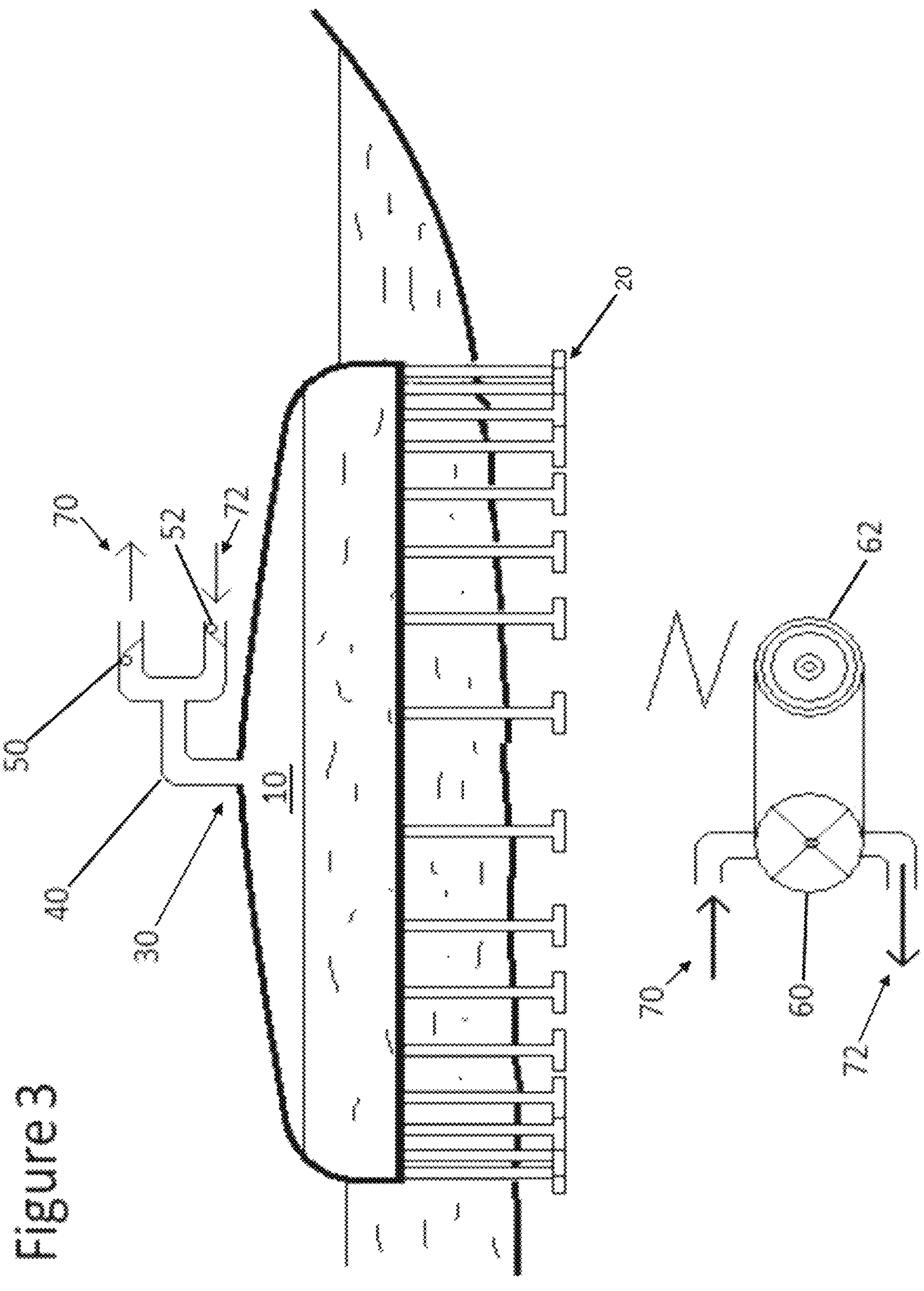

FIG. 3: depicts the present invention during ebb-tide/when the tide falls after high-tide.

The above-mentioned figures comprise the following parts:

10—hermetic cap
20—support posts/columns
30—vent port
40—converger/manifold
50, 52—unidirectional valves
60—pneumatic actuator
62—generator
70, 72—arrows indicating pressure flow through the system FIG. 1 depicts an example of the preferred system of the present invention. Wherein the system comprises a hermetic cap 10 positioned over a body of liquid, in this case water, that undergoes tidal changes. It is noted that these bodies of liquid may include the sea, estuary, or other body of liquid that periodically change in height. The cap 10 comprising a vent 30 coupled to one or more pipes that lead to a pneumatic actuator 60. Wherein the changes in the tidal level of the liquid, causes the air pressure within the cap 10 to change, thereby forcing air to flow through the pipes, with said air flow actuating the actuator 60. Wherein the actuator 60 turns a generator 62 to produce power. it is noted that in systems with more than one pipe coupled to the cap 10, the pipes are coupled to the vent 30 via a suitable converger, or manifold 40.

It is noted that in the depicted example, the hermetic cap 10 is attached to a plurality of pillars 20, which help to support, and anchor the cap 10. These, pillars 20 will be embedded into a foundation, at the bottom of the body of liquid, such as a sea bed, or estuary floor. This way the cap 10 does not drift away from the actuator 60, as this may result in damage to the pipes. Additionally, this may help to limit the movements of the cap 10 as the tide level changes. For if the cap 10 rises and falls with the tide the water level within the cap 10 may not change, meaning that the air pressure within the cap 10 will not change, and no power will be generated. However, it is preferable for the cap 10 to have some movement. In particular the cap 10 may need to move during seasonal tidal changes, wherein the maximum and minimum tide heights have changed, or when the average height of the body of liquid changes. This is because the user wants to ensure that the liquid does not raise above the top of the cap 10 as it may get into the vent 30 or pipes attached to the cap 10, more importantly when the tide falls the user does not want the water level to fall below the cap 10, as this may allow the air in the cap 10 to escape. Therefore, the cap 10 may be flexibly attached to the supporting pillars 20, or other support structure, using chains or a flexible member. Alternatively, pillars 20 may be configured to alter their height telescopically using interlocking sections that can extend and retract at a telescoping joint 22, to adjust the height of the cap 10 when the average height of the liquid changes.

As noted, the cap 10 comprises one or more vents 30, coupled to one or more pipes, for directing airflow to and from the actuator 60. As can be seen from the figure it is preferable that the vent be coupled to the upper most part of the cap 10. This is to reduce the risk of water entering the vent 30, and or pipes coupled to the vent 30, as this may obstruct the airflow through the pipe, and therefore may reduce the force exerted on the actuator 60. Additionally, the figure shows the vent 30 connecting to two pipes, one that is upstream from the actuator 60 and one that is downstream. With such an arrangement the efficiency of the system is improved. For when there is only one pipe, or in cases wherein there are multiple upstream pipes only, the force exerted on the actuator 60 would change direction, as the direction of the tide changes. As a result, the generator 62 would likely only produce power half of the time. However, with the depicted arrangement, with both upstream and downstream pipes the user can ensure that the actuator 60 is turning the generator 62 in the same direction, regardless of the direction of the tide, as indicated by the arrows 70,72 on the figures. To achieve this effect the pipes may each comprise a respective valve 50,52, so that the respective pipe can be open or closed as the tide changes direction. It is noted that in the depicted example these valves 50,52 are unidirectional, so that the valves 50,52 can be open by the force generated in the cap 10, removing the need to monitor the tide and manually adjust the valves as the tide changes. It is also noted that all the valves 50,52 may be closed at once to allow the force, caused either by an increase of air pressure or the creation of a vacuum within the cap 10, to reach a desired level before opening the respective valve to direct the airflow to/from the actuator 60, to ensure that sufficient force is exerted onto the actuator 60.

It should also be noted that the actuator 60 in the depicted example is in the form of a turbine, though other types of actuators may be used and more than one actuator 60 (e.g. turbine) may be used as depicted in FIG. 2. However, a turbine is preferable as it design allows the actuator 60 to easily capture the kinetic energy, exerted by the moving airflow, allowing for a more efficient transfer of energy from the airflow to the generator 62. And with the above-mentioned arrangement, with an upstream and downstream pipe between the cap 10 and the turbine, the user can ensure that the direction of the airflow through the turbine remains constant, that is to say that the flow will be in the same direction regardless of the direction of the tide, as indicated by the arrows 70, 72 within the figures.

FIG. 1 shows the present invention when the air pressure inside the cap 10 is considered neutral, meaning the air is roughly at atmospheric pressure. The system may likely be this way when the cap 10 is initially place, or at the point where the direction of the tide changes to be rising. In such a state there will initially be little if any airflow within the pipes. For this reason, in some cases, the cap 10 may comprise one or more pumps. Wherein these pumps can be configured to change the water level within the cap 10, by either pumping water, or air, into or out of the body of the cap 10. Thereby changing the air pressure within the cap 10 to create an airflow through the pipes, or to create a vacuum to generate suction within the pipes. In either case the system would increase the force acting on the actuator 60 to produce more power.

FIG. 2 depicts the same system as FIG. 1, however in this drawing the tide has risen. As the tide rises the water level within the hermetic cap 10 rises, this increases the air pressure within the cap 10. The now high-pressure air within the cap 10 may be metered, or directed through the pipes coupled to the cap's vent 30, by opening and closing the valves 50 of the upstream pipe. As shown by the arrow 70, the high-pressure air leaving the vent 30 is directed towards the actuator 60, in this case a turbine, where upon the airflow will turn the turbine to cause the generator 62 to produce power. After which the air may return to the hermetic cap 10, via the downstream pipe. It is noted that the valve 50 of the upstream pipe may be closed until the air pressure within the cap 10 reaches a desired value, or range, to ensure sufficient force is exerted on the turbine. And pumps coupled to the cap 10 may be used to pump in additional water, to further increase the air pressure, to try and increase the amount of power being produced during periods of high demand. It should be noted that some of the power produced by the generator 62 may be stored to be used to operate the valves 50,52 and pumps, or simply stored to be used during times of high demand.

FIG. 3, depicts the same example system as the other figures, but is this diagram the high tide has started to fall. As the water within the cap 10 begins to fall, there is no way for additional air to enter the hermetic cap 10, resulting in the formation of a vacuum within the cap 10. the generated vacuum produces a suction, which not only pulls the water into the cap 10, but will also pull the air within the pipes back towards the cap's vent 30. When this occurs the valve 50 to the upstream pipes may be closed, as the valves 72 of the downstream pipes open. This way, even though it is now the suction from the vacuum directing the airflow through the pipes, the direction of the flow remains the same. Meaning that even though the direction of the tide has changed the turbine will continue to turn in the same direction, allowing the generator 62 to continue to produce power. This suction will continue as long as there is a vacuum within the cap 10, though the water level in the cap 10 may eventually begin to fall until the system returns to the neutral state depicted in FIG. 1, wherein this cycle begins again. Again, the cap 10 may include pumps that can alter the amount of water within the cap 10 to preserve the vacuum, or may be used to remove water to try and increase the size of the vacuum and by extension the suction force produced.

It is also noted that some versions of the present invention may include a skirt 15 around the edge of the cap 10. The purpose of this skirt 15 is to redirect, or at least reduce any waves, or other fluctuations within the surface of the body of liquid. As such waves could allow air to enter the cap 10, either reducing the air pressure, or reducing the size of the vacuum, within the cap 10. In either case the additional air would reduce the force of the air flow, thereby reducing the amount of power being generated.

By using the above-mentioned system, the claim invention provides a renewable, eco-friendly power source, wherein the force exerted by changing tides is harnessed using the above-mentioned hermetic cap 10. it is noted that due to the predictable nature of the tides, for example at specific points in the sea, the user can reliably predict the amount of power that can be harnessed, and the size of the cap 10, or number of caps 10, needed to produce a required amount of power. additionally, through the use of pumps as described above the user may use some stored power to increase the output of the system, for example when the user predicts the system may not produce enough power to meet the likely demand, or during a sudden increase in demand. Thereby provide a reliable means of renewable energy.

The invention claimed is:

1. A tidal power generator, for generating power from a tidal body of water, the generator comprising:

a body having a hermetic cap and a lower open portion, the hermetic cap and the lower portion configured to form a trapped pocket of air within the body, wherein the trapped pocket of air is dimensioned and positioned to create a controlled air pressurised chamber optimized for tidal water height variation and substantially isolated from wave-induced oscillations, and the body comprising the hermetic cap is secured to a foundation;

a vent in an upper part of the hermetic cap;

a pipe coupled to the vent and having a valve coupled thereon and configured to control a flow of air through the pipe due to a tidal water height;

a pneumatic actuator coupled to the pipe and configured to be actuated by the air flow; and a power generator powered by the motion of the pneumatic actuator;

wherein the hermetic cap is secured to the foundation via one or more vertical columns, and the vertical columns are configured to telescopically expand, to change a height of the hermetic cap in response to changes in tidal levels.

2. The tidal power generator of claim 1 wherein the body further comprises a skirt along the edge of the open portion of the hermetic cap, the skirt being configured to prevent the air trapped within the hermetic cap from escaping.

3. The tidal power generator of claim 1, wherein the vertical columns are configured to prevent the hermetic cap from moving relative to the power generator.

4. The tidal power generator of claim 1, wherein the vent is coupled to the upper most part of the body.

5. The tidal power generator of claim 1, wherein the pneumatic actuator is a turbine.

6. The tidal power generator of claim 5, wherein a plurality of blades of the turbine are configured to rotate, in response to the direction of the air flow, so as to ensure that the turbine rotates in the same direction as the direction of the air flow, after the direction of the air flow changes due to the changing tide.

7. The tidal power generator of claim 5, wherein the tidal power generator comprises two additional turbines, wherein at least a first additional turbine is configured to rotate the generator when pressurised air flows into the actuator, at least a second additional turbine has blades disposed in an opposite direction to the first turbine, so that the second turbine is configured to rotate the generator when the air flows out of the actuator.

8. The tidal power generator of claim 1, wherein the pipe coupled to the vent of the hermetic cap is coupled to a manifold;

the manifold is coupled to a plurality of pipes, with each pipe having a respective valve configured to direct the air flow to, or from, the pneumatic actuator.

9. The tidal power generator of claim 8, wherein the valves in the pipes are unidirectional valves.

10. The tidal power generator of claim 1, wherein the plurality of pipes comprise pairs of pipes, each pair coupled to a respective pneumatic actuator and generator.

11. The tidal power generator of claim 1, wherein the hermetic cap is formed from re-enforced concrete or sheet material.

* * * * *